United States Patent
Ionescu

(10) Patent No.: US 7,469,018 B2
(45) Date of Patent: Dec. 23, 2008

(54) APPARATUS, AND ASSOCIATED METHOD, FOR FORMING A SIGNAL EXHIBITING SPACE-TIME REDUNDANCY

(75) Inventor: Dumitru Mihai Ionescu, Dallas, TX (US)

(73) Assignee: Nokia Corporation, Espoo (FI)

( * ) Notice: Subject to any disclaimer, the term of this patent is extended or adjusted under 35 U.S.C. 154(b) by 242 days.

(21) Appl. No.: 11/052,643

(22) Filed: Feb. 7, 2005

(65) Prior Publication Data

US 2005/0147180 A1    Jul. 7, 2005

Related U.S. Application Data

(63) Continuation of application No. 09/696,432, filed on Oct. 25, 2000, now Pat. No. 6,922,447.

(60) Provisional application No. 60/204,948, filed on May 17, 2000.

(51) Int. Cl.
    *H04L 27/00* (2006.01)
(52) U.S. Cl. .............. 375/295; 375/299; 375/267; 714/752; 714/755; 714/792
(58) Field of Classification Search ............ 375/295, 375/267, 299, 264, 347; 714/755, 792, 752
    See application file for complete search history.

(56) References Cited

U.S. PATENT DOCUMENTS

| | | | | |
|---|---|---|---|---|
| 5,253,271 A | * | 10/1993 | Montgomery | 375/295 |
| 5,541,955 A | * | 7/1996 | Jacobsmeyer | 375/222 |
| 5,848,103 A | * | 12/1998 | Weerackody | 375/295 |
| 6,115,427 A | * | 9/2000 | Calderbank et al. | 375/267 |
| 6,298,092 B1 | * | 10/2001 | Heath et al. | 375/267 |
| 6,357,029 B1 | * | 3/2002 | Sinha et al. | 714/752 |
| 6,560,295 B1 | * | 5/2003 | Hammons et al. | 375/299 |
| 6,678,263 B1 | * | 1/2004 | Hammons et al. | 370/342 |
| 6,724,842 B1 | * | 4/2004 | Hochwald et al. | 375/347 |
| 6,741,658 B1 | * | 5/2004 | Ionescu | 375/267 |
| 6,801,579 B1 | * | 10/2004 | Hassibi et al. | 375/264 |
| 6,865,237 B1 | * | 3/2005 | Boariu et al. | 375/295 |
| 2002/0090035 A1 | | 7/2002 | Seshadri et al. | |

FOREIGN PATENT DOCUMENTS

WO    WO 00/18056    3/2000

OTHER PUBLICATIONS

Space-time block codes from orthogonal designs, Tarokh et al., IEEE trans. on information theory, vol. 45, Jul. 1999.*
Seshadri, Nambi and Hamid Jafarkhani, "Super-Orthogonal Space-Time Trellis Codes", pp. 1439-1443, IEEE, 2002.
Jafarkhani, Hamid and Nambi Seshadri, "Super-Orthogonal Space-Time Trellis Codes", IEEE Transactions on Information Theory, vol. 49, No. 4, pp. 937-950, Apr. 2003.

* cited by examiner

*Primary Examiner*—Ted Wang
(74) *Attorney, Agent, or Firm*—Squire, Sanders & Dempsey

(57) ABSTRACT

Apparatus, and an associated method for a sending station operable in a communication system having a communication channel susceptible to fading, such as quasistatic fading. Transmission diversity of symbols to be sent by the sending station is increased without necessitating a corresponding increase in the bandwidth required to communicate the symbols.

32 Claims, 2 Drawing Sheets

APPARATUS, AND ASSOCIATED METHOD, FOR FORMING A SIGNAL EXHIBITING SPACE-TIME REDUNDANCY

CROSS-REFERENCE TO RELATED APPLICATIONS

The present invention is a continuation of patent application Ser. No. 09/696,432 filed Oct. 25, 2000, now U.S. Pat. No. 6,922,447 which claimed priority of provisional patent application No. 60/204,948, filed on 17 May 2000

The present invention relates generally to the communication of data upon a channel susceptible to quasistatic, or other, fading, such as a radio channel upon which data is transmitted during operation of a cellular communication system. More particularly, the present invention relates to apparatus, and an associated method, by which to increase the time diversity of the data communicated upon the channel, thereby to facilitate recovery of the data once received at a receiving station. Increased space-time redundancy, without a corresponding increase in channel bandwidth requirements, is provided through operation of an embodiment of the present invention.

BACKGROUND OF THE INVENTION

Advancements in communication technologies have permitted the introduction, and widespread usage of, wireless communication systems. Cellular communication systems, as well as other types of multi-user, wireless communication systems, are regularly utilized by large numbers of consumers to-communicate both-voice and non-voice information.

A communication system is formed, at a minimum, of a sending station and a receiving station interconnected by way of a communication channel. In a wireless communication system, the communication channel formed between the sending and receiving stations is formed of a radio channel defined upon a portion of the electromagnetic spectrum. Because a radio channel is utilized to form a communication link between the sending and receiving stations, a wired connection conventionally required in a wireline communication system is obviated. Use of a wireless communication system to communicate therethrough, thereby, is permitted at, and between, locations at which the formation of a wireline connection would be impractical. Also, as the need for the wireline connection between the sending and receiving stations is obviated, the infrastructure costs associated with installation of a communication system rather than a conventional wireline communication system are reduced.

A cellular communication system is exemplary of a wireless, multi-user radio communication system. Cellular communication systems have been installed throughout wide geographical areas and have achieved wide levels of usage. A cellular communication system generally includes a fixed network infrastructure installed throughout the geographical area which is to be encompassed by the communication system. A plurality of fixed-site base stations are installed at selected positions throughout the geographical area. The fixed-site base stations are coupled, by way of additional portions of the network infrastructure to a public network, such as a PSTN (Public-Switched, Telephonic Network). Portable transceivers, referred to as mobile stations, communicate with the base stations by way of radio links.

Because of the spaced-apart positioning of the base stations, only relatively low-power signals are required to be generated by the mobile stations and by the base stations to effectuate communications therebetween. A cellular communication system, as a result, typically efficiently utilizes the portion of the electromagnetic spectrum allocated thereto upon which radio channels are defined. That is to say, because only low-power signals are required to be generated, the same radio channels can be reused at different locations throughout the geographical area encompassed by the communication system.

In an ideal communication system, a communication signal, when received at a receiving station, is substantially identical to the corresponding communication signal when transmitted by a sending station. However, in a non-ideal communication system in which the communication signal must be transmitted upon a non-ideal communication channel, the signal, when received at the receiving station, is dissimilar to the corresponding communication signal when sent by the sending station. Distortion of the communication signal caused during propagation of the communication signal causes such dissimilarities to result. If the distortion is significant, the informational content is the signal cannot accurately be recovered at the receiving station.

Fading caused by multi-path transmission, for instance Raleigh fading, might alter the values of the information bearing bits of the communication signal during its transmission upon the communication channel. Quasistatic flat fading, for example, models the situation when the fading is flat in frequency and is constant during the duration of a relevant block of transmitted symbols, usually referred to as a frame. In contrast, fast flat fading models the situation when the fading is flat in frequency but changes as fast as from a transmitted symbol epoch to the next. If the propagation distortion is not properly corrected, the communication quality levels of the communications are, at a minimum, reduced.

Various techniques are utilized to overcome distortion introduced upon a communication signal as a result of transmission upon a non-ideal communication channel.

The redundancy of the transmitted signal through time encoding of the signal, prior to its transmission, is sometimes utilized to counteract the distortion introduced upon the signal during its transmission upon the communication channel. By increasing the time redundancy of the signal, the likelihood that the informational content of the signal can be recovered, once received at the receiving station, is increased. Introducing time redundancy into the signal is sometimes referred to as creating time diversity.

Utilization of space diversity is also sometimes utilized to overcome distortion introduced upon the communication signal. Typically, space diversity refers to the utilization of more than one transmit antenna transducer from which a communication signal is transmitted, thereby to provide spatial redundancy. The antenna transducers must be separated by a distance great enough to ensure that the signals communicated from the respective antenna transducers fade in an uncorrelated manner.

Space and time diversity are sometimes utilized together, thereby further to enhance transmission diversity to combat signal fading caused, e.g., by multi-path transmission.

Combinations of both space and time coding further enhance transmission diversity to combat signal fading caused by multi-path transmission. At any symbol epoch, exactly one symbol is transmitted from each transmit antenna. Each transmitted symbol is selected from the constellation of signal points that characterizes the modulator associated with a particular antenna. Note that the constellations pertaining to the different transmit antennas can be in general different, but in practice it may be preferable to have identical signal constellations for all transmit antennas. The particular constellation points selected to be sent over the different transmit antennas during an arbitrary (multiple)

transmission are appropriately determined from the encoder's output symbols. Trellis encoding is sometimes used to effectuate space time coding. But, block coding is valid too. In the former case, the selection of the constellation points, starting from the encoder's output symbols, is decided by a construction, referred to as a trellis, which describes all possible transitions between a given, finite number of states. The states are tuples of certain most recent symbols, e.g., bits, applied to the input of the trellis encoder. For example, if the input sequence consists of raw information bits, then the tuples reflect the most recent past history of the information bit sequence which is provided to the trellis encoder, and the trellis describes a transformation of an input sequence of bits, into an output sequence of symbols,-referred to as a coded symbol sequence. Note that the coded symbols can be non-binary, too. The trellis is represented by successive columns, comprised of all the valid states, and evolutions in time between states (in successive columns) are referred to as transitions. Each branch corresponds to a particular combination of new input symbols while in a given state. A mapper is utilized to map each coded symbol to a signal constellation point, thus determining the modulation parameters for a carrier signal.

In construction of the trellis and the mapper, a significant goal is to optimize the manner by which labels to trellis branches are assigned and to optimize the manner by which constellation points are assigned to the symbols used in the trellis branch labels. The optimality of the assignation is characterized in terms of a measure, referred to as a distance between two different codewords. The distance, ultimately, is determinative of the physically-meaningful, probability of a receiving station mistaking one codeword for another. The smaller the probability of a mistake, the better shall be the performance of a space-time code that is utilized in the effectuation of the communication. In order to ensure as large of a distance as possible between two codewords, a succession of points selected, during transmission, from the signal constellation, as dictated by the trellis, must be carefully determined during initial construction of the trellis. One approach to doing this is to maximize the minimum among all possible distances between pairs of transmitted codewords. To do this, codes are selected whose trellises have as large as possible pair wise distances between codewords. But, the distance spectrum is important too; it may be acceptable to accept a small minimum distance, if that distance occurs very seldomly.

A set of all signals that possibly can be selected for transmission upon a multiple number of transmit antennas, within a meaningful time interval and according to all possible patterns of input symbols, forms a space-time code. Subsequent to constructing the space-time code, the space-time code is implemented as an encoder at a sending station and as a decoder at a receiving station. A significant problem is to determine a manner by which to efficiently select points from a given signal constellation, in such a manner as to optimize an overall performance of the transmission scheme. Performance is defined, for instance, in terms of a Frame Error Probability (FEP).

The utilization of diversity to counteract the effects of fading, however, generally increases the bandwidth requirements of the radio channel to communicate the informational content of the communication signal to the receiving station. As bandwidth constraints upon the communication channel upon a radio communication system, as well as other types of communication systems limits the communication capacity of the system, efforts are generally also made to limit the bandwidth requirement to communicate information between a sending and a receiving station.

An increase in the diversity of the communication signal which requires, conventionally, an increase in bandwidth consumption to communicate a communication signal is contradictory to the competing goal of minimizing the amount of bandwidth required to communicate information between a sending and a receiving station.

If a manner could be provided by which to impart improved space-time redundancy to a communication signal without requiring an increase in the amount of bandwidth required to communicate a certain amount of information between a sending and receiving station, improved communication-quality, for a given communication capacity, would result.

It is in light of this background information related to the communication of information between a sending and a receiving station that the significant improvements of the present invention have evolved.

SUMMARY OF THE INVENTION

The present invention, accordingly, advantageously provides apparatus, and an associated method, by which to increase the transmission diversity of information communicated upon a communication channel susceptible to quasistatic, or fast, fading. By increasing the transmission diversity of the data, recovery of the data, once received at a receiving station, is facilitated.

Through operation of an embodiment of the present invention, increased space-time redundancy is introduced upon the data to be communicated upon the communication channel without a corresponding increase in the channel bandwidth requirements to communicate the data between a sending and a receiving station.

In one aspect of the present invention, apparatus is provided for a sending station operable to send a communication signal representative of the information to be communicated. At the transmitter, time diversity (redundancy) is imparted to the transmitted signal by channel-encoding the symbols forming the data in order to increase their redundancy.

In another aspect of the present invention, apparatus is provided by which to modulate the channel-encoded symbols and to provide the modulated symbols to two or more antenna transducers positioned in a manner by which to provide spatial diversity of the signal transmitted by the sending station. Symbols formed by the modulator are of the same size as symbols which could have been generated using merely a single antenna transducer coupled to the modulator. That is to say, the transmission rate is a rate of a value of one.

Through operation of an embodiment of the present invention, therefore, a space-time code design is provided for linear modulation in a manner by which to achieve diversity in fading channels by implementing both space and time redundancy upon the data to be communicated at a sending station. Encoding is provided both across time and across the antenna transducers of a sending station.

In one implementation, apparatus is provided for a sending station operable in a cellular communication system, such as the transmit portion of a mobile station or the transmit portion of a base station. Time redundancy is imparted upon the symbols to be communicated by applying the symbols to a channel encoder. Channel-encoded symbols in a number greater than the number of symbols applied to the channel encoder are mapped to constellation of modulator points which determine the transmitted signals after a mapping operation to the antenna transducers of the sending station. Improved communication quality is facilitated thereby without increasing the bandwidth required to communicate the symbols forming the data to be communicated by the sending station to the receiving station.

In these and other aspects, therefore, apparatus, and an associated method, is provided to a sending station operable in a radio communication system to send data upon a communication channel susceptible to distortion. The sending station has an antenna transducer set formed of at least one antenna transducer at which the data to be sent is transduced into electromagnetic form. The data is placed in a form to facilitate communication thereof upon the communication channel. A modulator is coupled to receive a group of encoder output symbols. The encoder output symbols are encoded representations of the data to be communicated upon the communication channel. The modulator forms a modulated sequence comprised of modulator output symbols. The modulator output symbols are of a number corresponding to a number of encoder output symbols of which the group of the encoder output symbols are formed together with a number of antenna transducers of which the antenna transducer set is formed.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
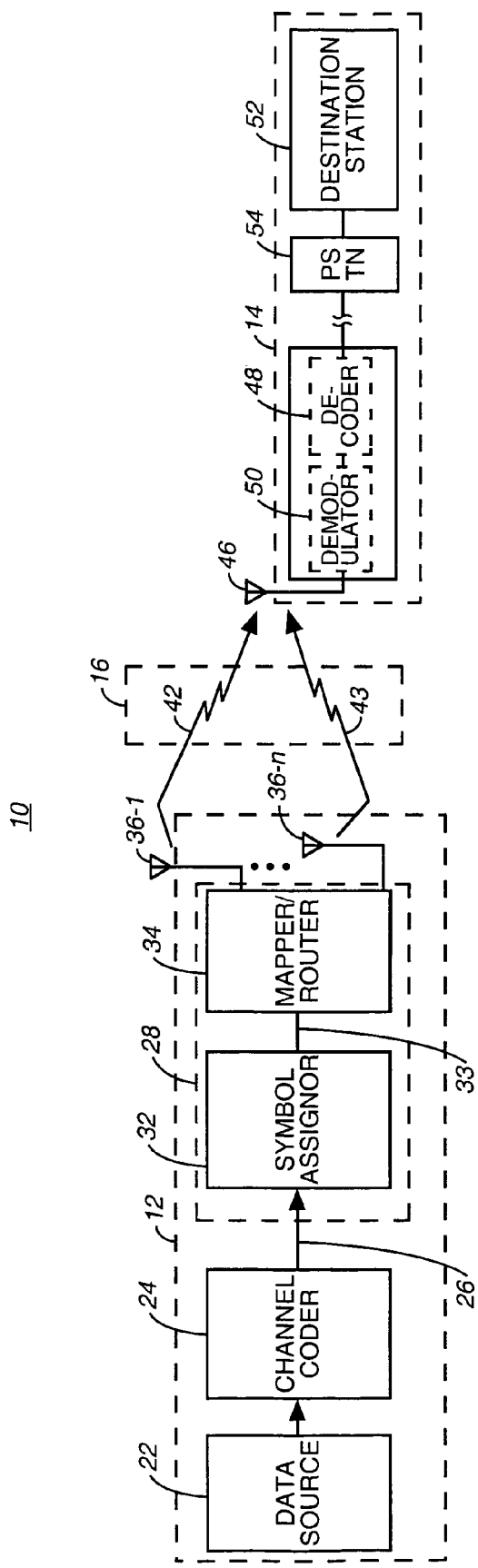
FIG. 1 illustrates a functional block diagram of a communication system in which an embodiment of the present invention is operable.

Referring first to FIG. 1, a communication system, shown generally at 10, is operable to communicate data between a sending station 12 and a receiving station 14 by way of a communication channel 16. The sending station uses at least one transmit antenna, in such a manner as to insure that the signals from all transmit antennas are mutually uncorrelated. Likewise, the receiving station uses at least one receive antenna. The communication channel is susceptible to fading, or somehow requires channel encoding across all transmit antennas. A wireless channel with multi-path propagation is sometimes referred to as a fading channel. For example, the channel can exhibit quasistatic fading.

The communication system 10 is representative of a cellular communication system in which, for example, the sending station 12 forms the transmit portion of a mobile station and the receiving station 14 forms the receive portion of a base station system. While the following description of the exemplary implementation shall be carried out with respect to an implementation in which the sending station 12 forms the transmit portion of a mobile station and the receiving station 14 forms the receive portion of a base station system, the sending and receiving stations 12 and 14 are analogously also representative of the transmit and receive portions, respectively, of the base station system and mobile stations operable in a cellular communication system. The following description, therefore, could similarly instead be carried out with respect to such operation. And, the sending and receiving stations are also representative of the sending and receiving stations operable in other types of communication systems, both wireline and non-wireline in which communication is realized over one or more parallel uncorrelated channels. An embodiment of the present invention is analogously also operable in such other types of communication systems.

The sending station 12 is here shown to include a data source 22 which sources the data which is to be communicated by the sending station to the receiving station. The data source, for instance, comprises voice data generated by a user of the mobile station of which the sending station is a part. The data source 22 is also representative of nonvoice data, such as that generated by a processing device. When a voice signal forms the data generated by the data source, appropriate processing circuitry, e.g., for source encoding, is utilized to convert the voice signal into digital form.

Data generated by the data source 22 is applied to a channel coder 24. The channel coder is operable to encode the data applied thereto according to a selected encoding scheme. The encoding scheme encodes the data applied thereto in order to increase the information's redundancy in time (time diversity). The channel coder generates encoder output symbols on the line 26. Each encoder output symbol formed by the channel coder occupies a time period, herein referred to as the (channel) encoder output symbol epoch.

The encoder output symbols are applied to a modulator 28 which forms, in part, a symbol assignor. The modulator is coupled to a mapper/router 34. After applying one or more encoder output symbols to the modulator, exactly one constellation point is selected, for-simultaneous transmission, from each of the signal constellations pertaining to all of the transmit antennas in each symbol epoch. The selection is indicated via indices that point to the appropriate modulation parameter values, according to the corresponding modulation schemes used by all of the transmit antennas. In the exemplary implementation, a QPSK (Quaternary Phase Shift Keying) modulation scheme is utilized, and the correct number of encoder output symbols are assigned, per transmission, to one of four constellation points defined in the QPSK constellation.

The modulator symbols to which the encoder output symbols are assigned are applied to the mapper/router 34. The mapper 34 is operable, pursuant to an embodiment of the present invention, to map the symbols applied thereto to a set of one or more antenna transducers 36. In the implementation shown in the figure, the set of antenna transducers includes $L_t$ antenna transducers 36-1 through 36-$L_t$. In the exemplary implementation, the mapper consists of a serial-to-parallel converter which converts a serial symbol stream applied thereto into parallel output symbols for application to the antenna transducers. The mapper 34 is operable to map selected ones of the symbols applied thereto through corresponding selected ones of the antenna transducers 36-1 through 36-$n$. Conventional sending-station circuitry positioned between the modulator 28 and the antenna transducers, such as amplification elements and I.ip-conversion elements, are not shown in the figure, for purposes of simplicity.

Each antenna transducer 36-1 through 36-$L_t$ is operable to transduce, into electromagnetic form, the symbols provided thereto, thereby to transmit the symbols upon the communication channel to the receiving station 14. Paths 42 and 43 are illustrated in the figure, pertaining to the antenna transducer 36-1. Such paths are representative of multiple paths conveying the electromagnetic signals transmitted to the receiving station. Because of the multiple, distinct, transmission paths that convey the communication signals, the signal from each-antenna transducer is susceptible to fading. The fading experienced by the signals from different antenna transducers lacks mutual correlation; that is to say, the fading processes affecting the signals from different antenna transducers are uncorrelated with one another.

The signals transmitted upon the paths 42 and 44 are sensed by an antenna transducer 46 which forms a portion of the receiving station 14. In the exemplary implementation, a single antenna transducer is utilized. The receiving station, in an alternate implementation, includes more than one antenna transducer. The antenna transducer is operable to convert the electromagnetic signals received thereat into electrical form and to provide the electrical signals to receiver circuitry of the receive portion of the receiving station. The receive circuitry includes a demodulator 50 operable to perform demodulation operations, in a manner operable generally reverse to that of the channel coder 24. Demodulated symbols are applied to a decoder 48 which is operable to decode symbols applied thereto, in a manner operable generally reverse to that of the channel coder 24. In one implementation, the decoder and demodulator are combined and joint demodulation and decoding operations are performed.

Additional circuitry of the receiving station is not separately shown and is conventional in nature. In an implementation in which the receiving station 14 forms the receive portion of a base station system, once the signal is operated upon by the receiving station 14, representative signals are provided to a destination station 52, here by way of a PSTN (Public-Switched, Telephonic Network) 54.

In operation, the encoder output symbols, once assigned by the symbol assignor 32, are applied by way of the line 33 to the mapper 34. The assignor generates a codeword which can be considered to be a concatenation of all symbols to be sent by all of the antenna transducers during/symbol epochs. The codeword, c, is defined to be formed of symbols applied to the mapper 34 and is represented mathematically as follows:

$$c = [c_k^{(1)} c_k^{(2)} \ldots c_t^{(L_t)} c_{k+1}^{(1)} c_{k+1}^{(2)} \ldots c_{k+1}^{(L_t)} \ldots c_{k+l-1}^{(1)} \ldots c_{k+l-1}^{(L_t)}]^T$$
$$= [c_k^T, \ldots, c_{k+l-1}^T]^T$$

wherein:

$L_t$ is the number of transmit antenna transducers 36-1 through 36-$L_t$, i.e., the number of antenna transducers of which the set of antenna transducers 36 is formed;

l is the length of a block of modulator symbol epochs over which encoding is performed jointly across all of the transmit antennas;

k is a discrete time instant at which a block of jointly encoded (across all transmit antennas) modulator output symbols commence; and $c_k^{(i)}$ is the complex symbol from the complex signal constellation pertaining to the i-th antenna transducer, assigned by the symbol assignor 32 to be transmitted at time instant k over antenna transducer 36-i.

Herein, we assume $l \geq L_t$; otherwise the product $D_{ec}^H D_{ec}$ discussed in the sequel should be replaced by $D_{ec} D_{ec}^H$.

The codeword c is also represented in matrix form as a code-matrix $D_{c,k}$ as follows:

$$D_{c,k} = \begin{bmatrix} c_k^{(1)} & c_k^{(2)} & \cdots & c_k^{(L_t)} \\ c_{k+1}^{(1)} & c_{k+1}^{(2)} & \cdots & c_{k+1}^{(L_t)} \\ \vdots & \vdots & \ddots & \vdots \\ c_{k+l-1}^{(1)} & c_{k+l-1}^{(2)} & \cdots & c_{k+l-1}^{(L_t)} \end{bmatrix}$$

wherein the elements are defined as above.

Each column of the matrix indicates complex symbols applied to a separate antenna. That is to say, the first column indicates complex symbols applied to a first antenna, the second column indicates complex symbols applied to a second antenna, and the $L_t$th column indicates symbols applied to the $L_t$th antenna. And, as indicated by the matrix k+l-1 symbols are applied to each antenna during a jointly encoded block of modulation symbols. The matrix shown above is the code-matrix representation of a codeword c. A corresponding code-matrix can be found to represent another codeword, such as codeword e. Also, a codeword difference matrix $D_{ec}$ is formed by taking a component-wise difference between the codematrices $D_e$ and $D_c$ in which the difference matrix is also represented by columns and rows of complex symbol, also one column per antenna transducer.

If each transmitted symbol on any transmit antenna is assumed to have energy $E_S$, then the energy transmitted by all $L_t$ transmit antennas in one symbol epoch is $L_t E_S$. If one compares the $L_t$-transmit antenna system with a system using only one transmit antenna, then the transmitted energies per symbol epoch should be the same for the single and multiple transmit antenna systems. In that case, each antenna in a multiple antenna system should transmit energy $E_S/L_t$ per (modulator) constellation symbol, and in all equations that follow $E_S$ should be replaced by $E_S/L_t$.

In general, the signal received at receive antenna j and at time t is:

$$\chi^{(j)}(t) = \sum_{i=1}^{L_t} \alpha_{i,j}(t) s^{(i)}(t) \sqrt{E_s} + \eta^{(j)}(t)$$

If the fading is assumed fast, the corresponding time dependence, also the equation:

$$s^{(i)}(t) = \sum_n c_n^{(i)} u(t - nT)$$

represents a succession of pulse-shaped symbols $c_N^{(i)}$, in which u(•) is the unit energy pulse; u(0)=1, and $\eta^{(j)}(t)$ is zero mean complex Gaussian noise with variance $N_0/2$ per dimension. In the sequel, the pulse shape is assumed to be chosen so as to render negligible intersymbol interference (ISI), i.e., full response signaling, and that synchronism results. Symbols are then sampled at t=kT and the detector is presented with $$\chi_k^{(j)} = \sum_{i=1}^{L_t} \alpha_{i,j}[k] c_k^{(i)} \sqrt{E_s} + \eta_k^{(j)}.$$

It is generally advantageous to group $\sqrt{E_s}$ with $\alpha_{i,j}(t)$. And, the denotation of:

$$\gamma_k^{(i,j)} = \sqrt{E_s}\alpha_{i,j}[k]$$

is used in the continuum case has the well-known auto-correlation function $$R_\gamma(\tau) = E\{\gamma^{(i,j)}(\cdot)\gamma^{(i,j)*}(\cdot-\tau)\} = E_s J_0(2\pi f_D^{(i,j)}\tau).$$

We have $$\chi_k^{(j)} = \sum_{i=1}^{L_t} c_k^{(i)} \gamma_k^{(i,j)} + \eta_k^{(j)}.$$

A single receive antenna assumption simplifies the above to $$\chi_k = \sum_{i=1}^{L_t} c_k^{(i)} \gamma_k^{(i)} + \eta_k.$$

The code disclosed exhibits significant performance improvement both in quasistatic (block) fading and in rapid fading. Block fading means that $\alpha_{i,j}(t)$ is constant over the duration of one codeword, or over one symbol epoch, but changes from one codeword to another. Essentially, the rank criterion is relevant in quasistatic fading in the sense that it determines the diversity level. In rapid fading, the important parameter when it comes to diversity is the symbol Hamming distance.

If the fading is assumed quasistatic $$\gamma_k^{(i)} = \gamma_{k+1}^{(i)} = \ldots = \gamma_{k+l-1}^{(i)} \stackrel{def}{=} \gamma^{(i)}, \forall i \in \{1, \ldots, L_t\}.$$

In matrix form, $\chi = D_c\gamma + \eta$ where subscript k was dropped and the obvious notations $$\chi = [\chi_k \ldots \chi_{k+l-1}]^T, \gamma = [\gamma^{(1)} \ldots \gamma^{(L_t)}]^T, \eta = [\eta^{(1)} \ldots \eta^{(L_t)}]^T$$

are used. Clearly, when fading is uncorrelated across the different transmit antennas, $$\gamma_i \stackrel{def}{=} \gamma^{(i)}$$

are i.i.d. zero mean complex Gaussian, with variance $E_s$. Conventionally it is known that the probability $Pr\{D_c \mapsto D_e\}$ of the receiver decoding a code matrix $D_c$ when $D_e$ was actually transmitted is upper bounded by a quantity which becomes, in the quasistatic fading case with perfect channel estimates.

$$Pr_1\{Dc \mapsto De\} = Pr\{2\mathfrak{R}(\eta^H D_{ec}\gamma) > \|D_{ec}\gamma\|^2\}$$

where $\mathfrak{R}(\cdot)$ is the usual notation for the real part of the argument, the superscript "H" denotes conjugated transposition and $D_{ec} = D_c - D_e$ is the code difference matrix for codewords e and c.

The $L_t$-transmit-antenna Rayleigh fading with perfect CSI, $Pr_1(D_c \mapsto D_e)$, is made as small as possible presuming certain conditions. The conditions include that, for all pairs $D_c, D_e \in C$, the Euclidean squared distance $tr(D_{ec}^H D_{ec})$ is made as large as possible and the non-square matrices $D_{ec}$ behave as unitary matrices, up to certain proportionality factors, in the sense that $D_{ec}^H D_{ec} = (tr(D_{ec}^H D_{ec})/L_t)I_{L_t}$.

Suboptimal codes should be characterized by matrices $D_{ec}^H D_{ec}$ whose main diagonal elements are as close as possible both to each other and to $tr(D_{ec}^H D_{ec})/L_t$, and for which the row-wise sum of the absolute values of the elements of the main diagonal is as small as possible for each row.

The following is a direct consequence of the above.

Suppose that $L=L_t$ divides l. Let $D_c, D_e, D_{ec}$ be viewed as block vectors, i.e. (l/L)×1 matrices whose entries are L×L submatrices with elements from the modulator constellations(s). Then any code matrix can be regarded as a sequence of l/L, block L×L sub-matrices, formed via a trellis whose branches span L modulator symbol epochs and are, each, labeled by a valid L×L sub-matrix. A path through the trellis is selected as a function of the current state and a block of new input symbols. Then, difference code matrices pertaining to an Error Event Path (EEP) of length k≦k' transitions (kL modulator symbols) should be optimal, in the sense of Proposition 1, for k' as large as possible, and as close to optimal as feasible for k>k'. A conventional Alamouti's transmit diversity scheme, referred to as Alamouti's scheme, for $L_t=2$ transmit antennas-based on the Hurwitz-Radon (HR) transform—does obey the structure outlined above and offers a simple means to implement the criteria discussed herein; simply append, to the output of an encoder, a mapper from encoded symbols to constellation points, followed by a HR transform. Likewise, space-time block codes conform with the above proposition by construction.

An improved space-time modulator is provided pursuant to an embodiment of the present invention. The modulator is operable in an environment which exhibits quasistatic fading. Quasistatic fading is particularly relevant because of its association with the fundamental concept of outage probability. The design of the proposed space-time code follows the criterion formulated above.

Additionally, a new trellis space-time code for 4PSK and $L_t=2$ transmit antennas is provided which also follows the criterion formulated above.

Figure 2:
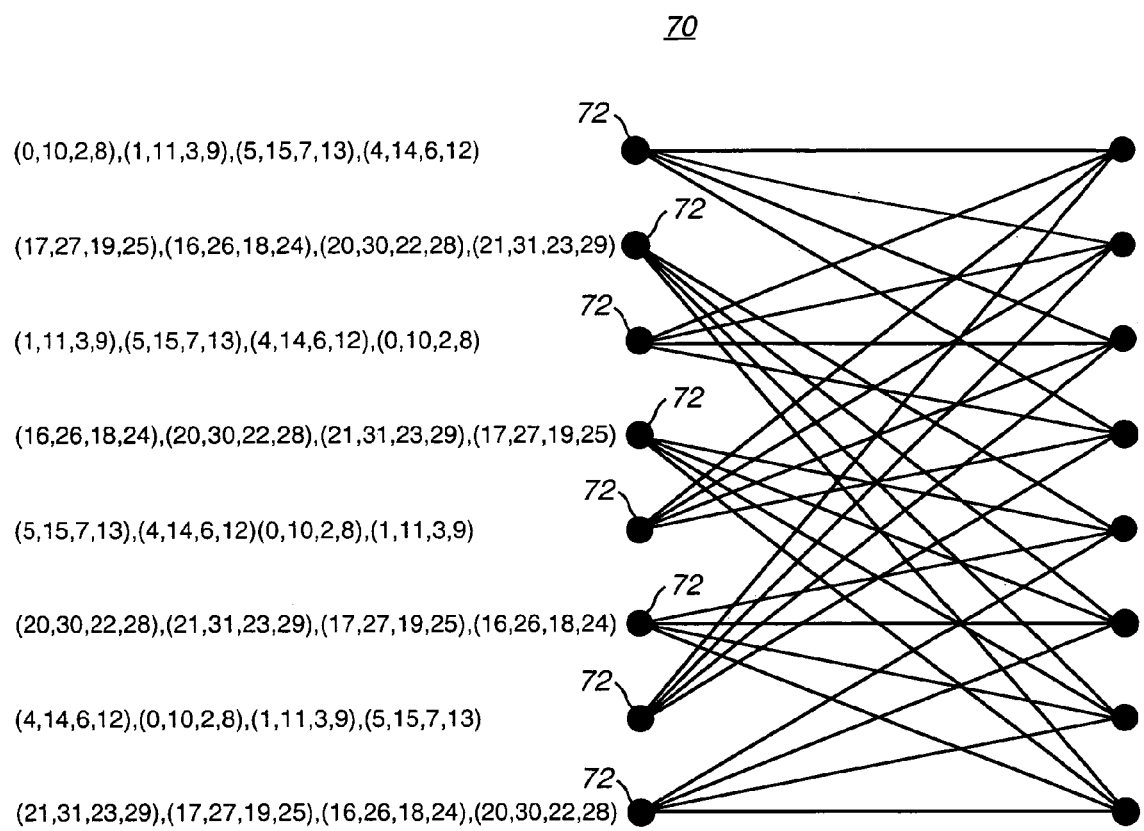
FIG. 2 illustrates a graphical representation of a trellis diagram representative of operation of a portion of the sending station of the communication system shown in FIG. 1.

FIG. 2 illustrates a trellis diagram 70 with the branch labels listed on the left hand side (as shown), designated at 72. The branch labels are grouped in 4-tuples, corresponding to groups of four parallel transitions from each state, and represent subscript indices of the matrices $C_i$, i=0, . . . ,31. The matrices are each 2×2 matrices.

The entries $C_i$, i=0, . . . ,31, represent indices of complex points from the 4PSK constellation. Each $C_i$ defines the 4PSK symbols to be sent over the L=2 transmit antennas, during two consecutive symbol epochs.

| $C_0 \ldots C_7$ | $C_8 \ldots C_{15}$ | $C_{16} \ldots C_{23}$ | $C_{24} \ldots C_{31}$ |
|---|---|---|---|
| $\begin{bmatrix}13\\00\end{bmatrix}$ | $\begin{bmatrix}33\\02\end{bmatrix}$ | $\begin{bmatrix}31\\00\end{bmatrix}$ | $\begin{bmatrix}11\\02\end{bmatrix}$ |
| $\begin{bmatrix}12\\10\end{bmatrix}$ | $\begin{bmatrix}32\\12\end{bmatrix}$ | $\begin{bmatrix}30\\10\end{bmatrix}$ | $\begin{bmatrix}10\\12\end{bmatrix}$ |
| $\begin{bmatrix}11\\20\end{bmatrix}$ | $\begin{bmatrix}31\\22\end{bmatrix}$ | $\begin{bmatrix}33\\20\end{bmatrix}$ | $\begin{bmatrix}13\\22\end{bmatrix}$ |
| $\begin{bmatrix}10\\30\end{bmatrix}$ | $\begin{bmatrix}30\\32\end{bmatrix}$ | $\begin{bmatrix}32\\30\end{bmatrix}$ | $\begin{bmatrix}12\\32\end{bmatrix}$ |
| $\begin{bmatrix}03\\01\end{bmatrix}$ | $\begin{bmatrix}23\\03\end{bmatrix}$ | $\begin{bmatrix}21\\01\end{bmatrix}$ | $\begin{bmatrix}01\\03\end{bmatrix}$ |
| $\begin{bmatrix}02\\11\end{bmatrix}$ | $\begin{bmatrix}22\\13\end{bmatrix}$ | $\begin{bmatrix}20\\11\end{bmatrix}$ | $\begin{bmatrix}00\\13\end{bmatrix}$ |
| $\begin{bmatrix}01\\21\end{bmatrix}$ | $\begin{bmatrix}21\\23\end{bmatrix}$ | $\begin{bmatrix}23\\21\end{bmatrix}$ | $\begin{bmatrix}03\\23\end{bmatrix}$ |
| $\begin{bmatrix}00\\31\end{bmatrix}$ | $\begin{bmatrix}20\\33\end{bmatrix}$ | $\begin{bmatrix}22\\31\end{bmatrix}$ | $\begin{bmatrix}02\\33\end{bmatrix}$ |

Consequently, each trellis branch covers two consecutive 4PSK symbol epochs, which constitutes a similarity with Multiple Trellis-Coded Modulation (MTCM) over two adjacent symbol epochs. However, the Euclidean distance squared between two arbitrary matrices selected from the 32 matrices $C_i$ is not, in general, proportional to the Euclidean distance squared between their respective first columns. Using this fact, it is easy to see that the space-time trellis depicted in FIG. 2 is not a MTCM trellis code.

In the case of one receive antenna, FIG. 2 compares the average frame error probability curve for this trellis space-time code, against those of Alamouti's scheme and two other trellis space-time codes from [27]—all in quasistatic fading and at the same spectral efficiency of 2 bits per second per Hertz.

The assigned branch labels were selected so as to verify that, given the number of states together with the transmission are shown in FIG. 1.

The minimum Euclidean distance between any two branches leaving (arriving into) a given state is maximized. $D_{ec}^H D_{ec}$ has equal eigenvalues for all difference code matrices $D_{ec}$ corresponding to EEPs of length $k \geq 2$ (i.e., up to 4 4PSK symbols).

The two eigenvalues of $D_{ec}^H D_{ec}$ are balanced and give by $p+2(2-\sqrt{3}), p+2(2+\sqrt{3})$, for all EEPs of length $k=3$, where $p \geq 4$. Thereby, the squared Euclidean distance between an EEP of length $k=3$ (6 4PSK symbol epochs) and the corresponding correct path is at least 16.

The symbol Hamming distance between any two parallel transitions is 2, thereby guaranteeing a diversity of 2 in rapid fading.

In operation, symbols generated by the symbol assignor form a serial symbol stream of symbols which are coded in manners to overcome fading when transmitted upon the communication channel. When routed to the antenna transducers and transduced thereat, the bandwidth required to communicate the symbols from a plurality of antenna transducers is no greater than the bandwidth required to communicate the non-space-time-coded symbols from a single antenna transducer.

Thereby, a manner is provided by which to ensure best that the transmission of the signals generated during operation of the sending station 12 exhibits maximum transmit diversity in fading. The maximum diversity better ensures that the information, when received at the receiving station 14, is recoverable.

The preferred descriptions are of preferred examples for implementing the invention, and the scope of the invention should not necessarily be limited by this description. The scope of the present invention is defined by the following claims.

I claim:

1. A telecommunications system, comprising:
a transmitter having an encoder; and
at least two transmission elements coupled to the transmitter,
wherein the encoder is configured to
receive a group of input data bits,
select a particular space-time block code from a set of space-time block codes, based on the group of input bits and a state of the encoder,
select at least two modulation symbols, one symbol for each of the at least two transmission elements, based on the group of input bits and the state of the encoder after selecting the particular space-time block code, and
encode the group of input data bits, using the particular space-time block code and the at least two modulation symbols, for transmission by the at least two transmission elements.

2. The telecommunications system of claim 1, wherein the set of block codes from which the encoder of said transmitter selects the particular space-time block code comprises a set of matrices.

3. The telecommunications system of claim 2, wherein each matrix of the set of matrices defines an index of complex points from a symbol constellation.

4. The telecommunications system of claim 3, wherein the symbol constellation from which the index of the complex points is defined comprises a quaternary phase shift keying constellation.

5. The telecommunications system of claim 3, wherein each matrix forms a 2×2 matrix, defining complex points for each of said two transmission elements during two consecutive symbol epochs.

6. The telecommunications system of claim 2, wherein the set of matrices, formed of the, space-time block codes from which the particular space-time block code is selected, are formed of code symbols that, for any pair of space-time block codes of the set, correspond to a shortest error event exhibiting mathematical differences that define a difference matrix, such that the difference matrix multiplied together with a hermetian of the difference matrix is proportional to an identity matrix for at least the shortest error event.

7. The telecommunications system of claim 6, wherein the encoder is configured to select the code symbols such that the difference matrix substantially corresponds to the identity matrix multiplied together with a selected constant.

8. The telecommunications system of claim 1, wherein the particular space-time block code comprises a trellis space-time block code.

9. A method, comprising:
selecting a particular space-time block code from a set of space-time block codes, based upon a group of input data bits;
selecting at least two modulation symbols for application to at least two transmission elements, based upon the group of the input bits, after selecting the particular space-time block code; and encoding the group of the input data bits using the particular space-time block code and the at least two modulation symbols, thereby to convert the input data bits of the group into a converted form for communication by a sending station.

10. The method of claim 9, wherein the set of space-time block codes from which the particular space-time block codes is selected during said operation of selecting the particular space-time block code comprises a set of matrices.

11. The method of claim 10, wherein each matrix of the set of matrices defines an index of complex points from a symbol constellation.

12. The method of claim 11, wherein the symbol constellation from which the index of the complex points is defined comprises a quaternary phase shift keying constellation.

13. The method of claim 11, wherein each matrix forms a 2×2 matrix, defining complex points for application to a set of transmission elements during two consecutive symbol epochs.

14. The method of claim 9, wherein the encoding performed during said operation of encoding comprises trellis space-time block coding.

15. A telecommunications system, comprising:
a transmitter; and
a receiver,
wherein the transmitter comprises
  a data source,
  a channel coder coupled to the data source,
  a modulator coupled to the data source via a channel coder, and
  a plurality of transmission elements coupled to the data source via the modulator,
wherein the modulator comprises,
  a symbol assignor coupled to the data source via the channel coder, and
  a mapper router coupled to the data source via the symbol assignor,
wherein the receiver is configured to receive an output of the plurality of transmission elements,
wherein the channel coder is configured to encode data from the data source in a time diversity increasing manner, and
wherein the modulator is configured to select to be roughly simultaneously transmitted one constellation point per signal constellation for each of the plurality of transmission elements, according to a predetermined modulation scheme.

16. The telecommunications system of claim 15, wherein the modulation scheme comprises a quaternary phase shift keying modulation scheme.

17. The telecommunications system of claim 16, wherein the modulation scheme comprises a scheme of trellis space-time codes yielding maximized minimum Euclidian distance between any two branches leaving a given state.

18. An apparatus, comprising:
receiving means for receiving a group of input data bits;
first selecting means for selecting a particular space-time block code from a set of space-time block codes, based on the group of input bits and a state of the apparatus;
second selecting means for selecting at least two modulation symbols, one symbol for each of at least two transmission elements communicatively coupled to the apparatus, based on the group of input bits and the state of the apparatus after the operation of the first selecting means; and
encoding means for encoding the group of input data bits, using the particular space-time block code and the at least two modulation symbols, for transmission by the at least two transmission elements.

19. An apparatus, comprising:
a receiver configured to receive a group of input data bits;
a first selector configured to select a particular space-time block code from a set of space-time block codes, based on the group of input bits and a state of the apparatus;
a second selector configured to select at least two modulation symbols, one symbol for each of the-at least two transmission elements communicatively coupled to the apparatus, based on the group of input bits and the state of the apparatus after the operation of the first selector; and
an encoder configured to encode the group of input data bits, using the particular space-time block code and the at least two modulation symbols, for transmission by the at least two transmission elements.

20. The apparatus of claim 19 wherein the set of block codes from which the apparatus selects the particular space-time block code comprises a set of matrices.

21. The apparatus of claim 20, wherein each matrix of the set of matrices defines an index of complex points from a symbol constellation.

22. The apparatus of claim 21, wherein the symbol constellation from which the index of the complex points is defined comprises a quaternary phase shift keying constellation.

23. The apparatus of claim 21, wherein each matrix forms a 2×2 matrix, defining complex points for each of said two transmission elements during two consecutive symbol epochs.

24. The apparatus of claim 20, wherein the set of matrices, formed of the space-time block codes from which the particular space-time block code is selected, are formed of code symbols that, for any pair of space-time block codes of the set, correspond to a shortest error event exhibiting mathematical differences that define a difference matrix, such that the difference matrix multiplied together with a hermetian of the difference matrix is proportional to an identity matrix for at least the shortest error event.

25. The apparatus of claim 24, wherein the apparatus is configured to select the code symbols such that the difference matrix substantially corresponds to the identity matrix multiplied together with a selected constant.

26. The apparatus of claim 19, wherein the particular space-time block code comprises a trellis space-time block code.

27. An apparatus, comprising:
a channel coder coupled to a data source; and
a modulator coupled to the data source via the channel coder, wherein the modulator is configured to couple a plurality of transmission elements to the data source,
wherein the modulator comprises,
  a symbol assigner coupled to the data source via the channel coder, and
  a mapper router coupled to the data source via the symbol assignor,
wherein the channel coder is configured to encode data from the data source in a time diversity increasing manner, and
wherein the modulator is configured to select to be simultaneously transmitted one constellation point per signal constellation for each of the plurality of transmission elements, according to a predetermined modulation scheme.

28. The apparatus of claim 27, wherein the modulation scheme is a quaternary phase shift keying modulation scheme.

29. The apparatus of claim 27, wherein the modulation scheme is a scheme of trellis space-time codes yielding maximized minimum Euclidian distance between any two branches leaving a given state.

30. An apparatus, comprising:

channel coder means for channel coding coupled to data source means for providing data;

modulator means for modulating coupled to data source means via the channel coder means, wherein the modulator means is configured to couple a plurality of transmission means for transmitting to the data source means, wherein the modulator means comprises, symbol assigner means for assigning symbols coupled to the data source means via the channel coder means, and mapper router means for mapping coupled to the data source means via the symbol assignor means;

encoding means for encoding the data from the data source means in a time diversity increasing manner; and selecting means for selecting to be simultaneously transmitted one constellation point per signal constellation for each of the plurality of transmission means, according to a predetermined modulation scheme.

31. The apparatus of claim 30, wherein the modulation scheme is a quaternary phase shift keying modulation scheme.

32. The apparatus of claim 30, wherein the modulation scheme is a scheme of trellis space-time codes yielding maximized minimum Euclidian distance between any two branches leaving a given state.

* * * * *